(12) United States Patent
Sky

(10) Patent No.: US 8,778,441 B2
(45) Date of Patent: Jul. 15, 2014

(54) READY-TO-EAT OAT-BASED FOOD PRODUCT

(76) Inventor: Phillip Sky, Altoona, PA (US)

( * ) Notice: Subject to any disclaimer, the term of this patent is extended or adjusted under 35 U.S.C. 154(b) by 901 days.

(21) Appl. No.: 12/590,659

(22) Filed: Nov. 12, 2009

(65) Prior Publication Data

US 2010/0119687 A1    May 13, 2010

Related U.S. Application Data

(60) Provisional application No. 61/199,082, filed on Nov. 13, 2008.

(51) Int. Cl.
| | | |
|---|---|---|
| *A23L 1/168* | (2006.01) | |
| *A23L 1/30* | (2006.01) | |
| *A21D 10/00* | (2006.01) | |

(52) U.S. Cl.
CPC .................................. *A23L 1/168* (2013.01)
USPC .............................. 426/619; 426/72; 426/549

(58) Field of Classification Search
USPC .................... 426/618, 619, 549, 72
See application file for complete search history.

(56) References Cited

U.S. PATENT DOCUMENTS

| | | | |
|---|---|---|---|
| 4,834,988 A * | 5/1989 | Karwowski et al. ............. 426/20 |
| 4,861,614 A * | 8/1989 | Seaborne ...................... 426/619 |
| 4,957,762 A | 9/1990 | Finnerty et al. |
| 5,024,996 A * | 6/1991 | Ringe ............................ 514/54 |
| 5,035,913 A | 7/1991 | Sky |
| 7,396,550 B2 | 7/2008 | Angel |
| 7,740,891 B2 | 6/2010 | Foster |
| 2002/0025367 A1 * | 2/2002 | Koehler et al. ............... 426/549 |
| 2006/0251787 A1 * | 11/2006 | Angel .......................... 426/549 |
| 2008/0089980 A1 * | 4/2008 | Foster et al. .................... 426/72 |

OTHER PUBLICATIONS

NPL "Conversion Factor" retrieved on May 15, 2012.*

* cited by examiner

*Primary Examiner* — Humera Sheikh
*Assistant Examiner* — Bhaskar Mukhopadhyay
(74) *Attorney, Agent, or Firm* — Vinnovations Law, PLLC

(57) ABSTRACT

A method of making concentrated and high viscosity oatmeal based food product that contains an enhanced and desirable flavorant profile and is easily adaptable to portable meals and mass distribution. The oatmeal product can be incorporated into an on the go food item, while retaining the beneficial health characteristics of a porridge.

10 Claims, 1 Drawing Sheet

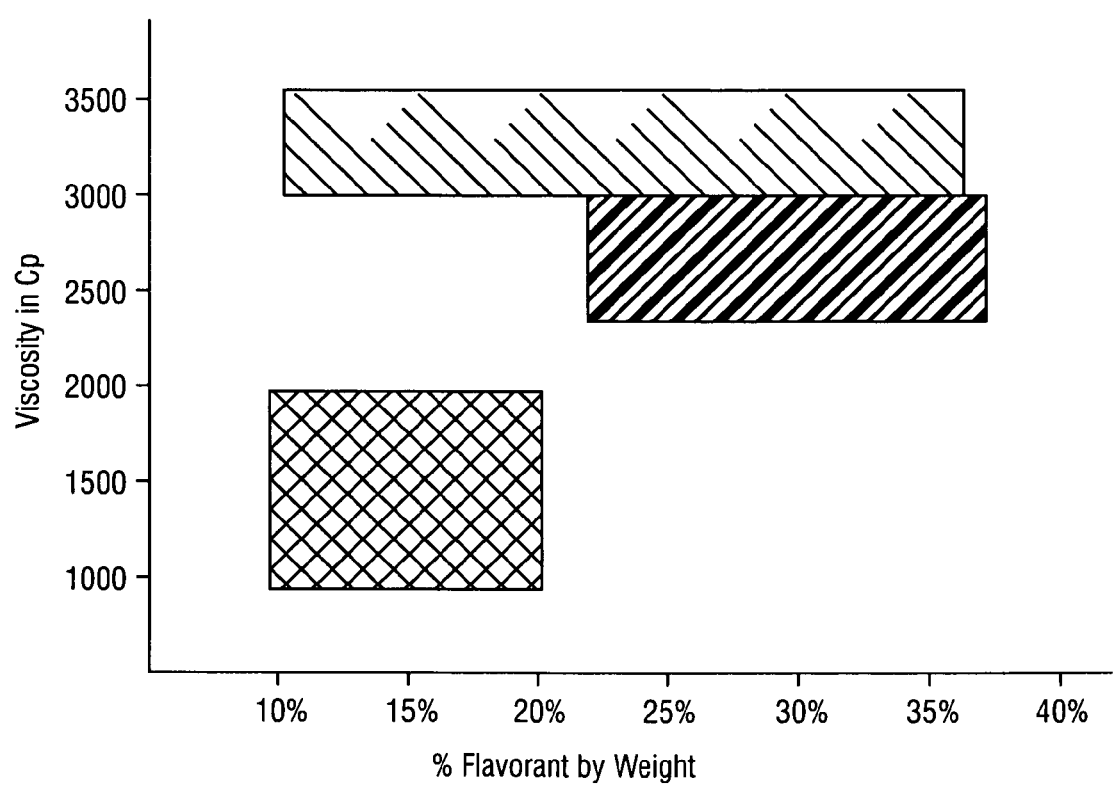

READY-TO-EAT OAT-BASED FOOD PRODUCT

REFERENCE TO RELATED APPLICATIONS

This application claims priority to U.S. Provisional Patent Application No. 61/199,082, filed Nov. 13, 2008.

INTRODUCTION

The present teachings describe a concentrated non-solid oatmeal based food product that is easily adaptable to portable meals and mass distribution.

In recent years there has been a resurgence of interest in what is commonly referred to as "oatmeal." This term generally refers to a cereal porridge made from either steel cut oats or rolled oats. Generally speaking, the phrase oatmeal refers to a porridge with a viscosity and water content suitable so that it may be eaten from a bowl with a spoon. The increased interest in oatmeal in recent years is due to medical discoveries about its beneficial effects on blood cholesterol. In addition, oats are a whole grain, for which there has been significant increased consumer demand. There have been described many forms of preparing oatmeal porridge, including microwavable forms which allow the consumer to quickly prepare a breakfast. However, all of these products and methods for preparation relate to oatmeal porridge that is designed to be eaten from a bowl at a table or similar setting.

Many consumers currently seek alternatives to sit down breakfast meals, and many products have arisen based on the automobile drive-through restaurant, or take-out breakfast markets. Many foods have been developed for "on the go" consumption, meaning that the products may be consumed as a part of a portable meal. To date, there are no known oatmeal products that fit into this category. To the contrary, all such non-solidified products, methods and formulations are inappropriate for consumer friendly consumption. Accordingly, there is a need for a non-solidified oatmeal product that may be incorporated into a portable or on the go food item that maintains the same beneficial health characteristics as conventional oatmeal porridge, and that contains desirable flavorings.

SUMMARY

The popularity of oatmeal increased after a January 1997 decision by the United States Food and Drug Administration that foods containing significant oat bran or rolled oats may carry a label stating that oats reduce the risk of heart disease when included as part of a low fat diet. These benefits derive from the fact that oats contain beta glucans, which are notable for their ability to modulate the immune system. In addition, rolled oats contain a high level of complex carbohydrates and water soluble fiber which encourages slow digestion and stabilizes blood glucose levels. However, despite these developments, studies have shown that the overall levels of oatmeal consumed in the United States have remained relatively stable for over 21 years. One potential reason there has not been growth in the consumption of oatmeal is the fact that it is not, in its current formulation, adaptable to the lifestyle of many modern consumers.

The present teachings are directed to a composition and method for the preparation of portable oatmeal products with a unique viscosity profile and an enhanced flavorant profile. The oatmeal products can be incorporated into various on the go breakfast products, including as a primary filling material for standard wraps, as a spread on bagels, toast, and other similar bakery items.

DEFINITIONS

As used herein, "oatmeal" refers to an ordinary viscosity porridge style cereal made from rolled oats or steel cut oats.

As used herein, "high viscosity oatmeal" refers to a concentrated, non-solid cereal made from oats, but which can also comprise up to about 63% other grains (various embodiments use about 56% oat grain products and about 44% other grain products), and which has a final cooked viscosity of at least about 2,500 cp, and up to about 3,000 cp.

As used herein, "steel cut oats" refers to whole grain groats (the inner portion of the oat kernel) which have been cut into only two or three pieces. Steel cut oats are also referred to in the industry as coarse cut oats, Scotch oats or Irish oats.

As used herein, the phrase "rolled oats" means the traditional oat groats that have been rolled into flat flakes under heavy rolling equipment. The rolled oat has the hard inedible outer husk removed during the rolling process.

As used herein, "enhanced flavor intensity" means the inclusion of oatmeal flavorings equal to or greater than at least about 150% or, in other embodiments, 200% or more of the amount of flavorings used in the preparation of a standard porridge.

BRIEF DESCRIPTION OF THE DRAWINGS

The skilled artisan will understand that the drawings described below are for illustration purposes only. The drawings are not intended to limit the scope of the present teachings in any way.

FIG. 1 is a bar graph depicting the high viscosity profile of the oatmeal product of the present teachings, as well as the unusually high degree of flavorants utilized therein.

DESCRIPTION OF VARIOUS EMBODIMENTS

The present teachings significantly alter the preparation techniques for oatmeal by dramatically increasing the cooking times to within the range of 30 to 90 minutes in order to achieve an end product with a much higher viscosity, generally in the range of about 2,500 cp to about 3,000 cp, as opposed to a standard oatmeal porridge, which has a viscosity of generally about 2,000 cp. This standard viscosity produces a consistency generally associated with porridge able to be easily eaten with a spoon.

The percentage of water by weight of the high viscosity oatmeal product of the present teachings is generally between about 63% and about 75% and, in some embodiments, between about 65% and about 70%, which effectively minimizes spillage or dripping while eating or spreading the oatmeal filling.

The present teachings are also directed to an approach and method of adding an unusually high concentration of flavorings to a high viscosity oatmeal product. The end intended use for the high viscosity oatmeal product of the present teachings is generally in smaller quantities than an ordinary oatmeal serving of standard viscosity. Moreover, the high viscosity oatmeal product is frequently applied to bland items such as tortilla shells, bagels, pancakes, waffles, bread, etc. Accordingly, the oatmeal product must compensate for the final taste to be equivalent to an "all oatmeal" product. Thus, the high viscosity oatmeal product of the present teachings has a significantly higher flavor intensity than that ordinarily utilized.

The oatmeal consumer may add flavoring to oatmeal to increase its desirability. These flavorings may include brown sugar, salt or cinnamon. However, even with the addition of these ingredients, the resulting food product is inappropriate for consumption "on the go" because of the average low viscosity, composition, and higher water content of oatmeal made pursuant to methods established in the art. As an example, in flavoring ordinary oatmeal formulations with brown sugar, ordinarily no more than one tablespoon of brown sugar would be utilized to flavor one cup of prepared oatmeal porridge. However, consistent with the present teachings, the flavoring is, by way of example, at least twice as powerful and intense, both before and after the desired viscosity range for the invention is achieved. This enhanced flavor intensity is a salient feature of oatmeal products made in accordance with the present teachings, as shown in the examples set forth below.

The resulting non-solidified but high viscosity oatmeal product can be utilized in a variety of on the go food products, and various combinations of grains and/or seeds can be used such as pre-processed or unprocessed wheat, flax, rye, barley and corn. For instance, oatmeal prepared according to the present teachings can be placed inside a standard flour or grain based food wrap, bread, tortilla shell, bagel, pancake, waffle, cereal bar, "dough pocket" etc. and can thereafter be microwaved or heated briefly prior to consumption, or can be served at room temperature or colder. Other flavorings or fruit items can be added to the wrap along with the oatmeal product. In addition, the oatmeal product can be used as a "spread" on a bagel, toast, or other similar baked product. Its unique viscosity and water content ranges also allow the oatmeal product to be frozen after being assembled and incorporated into finished food items, including for resale at convenience stores, grocery stores and other venues. Through this method, the oatmeal product can be thawed and reheated in a take out or restaurant setting. Ordinary oatmeal porridge does not allow for the creation of such frozen heat and serve on-the-go products.

The patent to Sky, et al. describes a method for preparing oatmeal porridge; however, the patent teaches away from the instant invention in that the resulting significantly lower viscosity, higher water content by weight porridge would not be useful for the purposes set forth herein. The average viscosity of standard oatmeal porridge is much lower than that of the present teachings. The standard percentage by weight of water is approximately 85% water, and between 80% and 90%. For instance, a typical simple serving of microwaveable oatmeal is approximately 85% water by weight when prepared according to standard directions, where the oatmeal product weighs 1.38 oz and 8 oz of water is used. In addition, the publication to Foster also teaches away from the invention herein. Foster discloses an oatmeal product that is a "solidified mass" and thus is actually non-viscous and has a much lower percentage of weight by water (i.e. between 35% and 60%). Furthermore, the oatmeal solid described in Foster could not be utilized in the food serving methods disclosed herein.

FIG. 1 depicts a graph of viscosity plotted against the percentage of flavorant by weight. As shown in the graph, conventional oatmeal is confined to two regions. The first region 12, represents ordinary spoon eaten porridges, where viscosity is always below 2000 cp, and flavorants amount to less than 20% by weight of the oatmeal. The second region 14, representing non-viscous solid or semi-solid oatmeal porridges, are not able to be utilized for purposes of the present teachings. The third region 16 depicts the high viscosity and flavor enhanced oatmeal products according to the present teachings.

Various oatmeal product samples according to the present invention were prepared by To Market Two Markets, Inc. Testing of the oatmeal product samples was conducted at North Carolina State University by Nutri Food Business Consulting, Chapel Hill, N.C.

The viscosity of various oatmeal products according to the present invention was determined using a Brookfield Viscometer and a Bostwick Consistometer. Brookfield viscometry was performed on the oatmeal product samples under the following conditions: 100rpm, spindle 5 at approximately 165°-170° F. Likewise, the samples were tested using a Bostwick Consistometer at approximately 70° F. for 30 seconds.

Results

| Oatmeal Product Enhanced Flavorings | Brookfield Viscometer Viscosity (cP) at 165° F., 100 rpm, Spindle 5 | Bostwick Consistometer (mm) after 30 sec., 70° F. | Bostwick Consistometer (mm) after 30 sec., 165° F. |
| --- | --- | --- | --- |
| Apple raisin | 10,560 | No flow | 10 |
| Pineapple coconut | 10,560 | No flow | No flow |
| Blueberry | 8960 | No flow | 32.5 |

"No flow" indicates that the oatmeal product samples were too viscous to flow within the 30 second time limit for the tests.

"No flow" indicates that the oatmeal product samples were too viscous to flow within the 30 second time limit for the tests.

EXAMPLES

The processing steps described below can be used to generate an oatmeal product in accordance with the present teachings. It will be understood that the following processing steps are for illustration purposes only and are not intended to limit the scope of the present teachings in any way.

Preparation and cooking of the oatmeal product can be carried out under aseptic conditions using, for example, an enclosed apparatus, capped or encased container, covered saucepan, sealed tank or boiler, etc. In some embodiments, cookware such as a stainless steel closed kettle, including, for example, a double motion agitator, is used for preparation of the oatmeal product. Such closed kettle and other sealed containers advantageously prevent cook off.

To the enclosed apparatus are added water and flavorings that are cooked for a period of time and reach a temperature elevated over boiling point. In some embodiments, the water and flavorings are cooked for about 1 to 3 minutes and reach a minimum temperature of about 190° F. to 220° F. In other embodiments, the water and flavorings are cooked for at least about 3 minutes and reach a minimum temperature of about 200° F.

The selection of a particular flavoring or flavoring combination can, in part, be determined based on taste and marketing considerations. In regard to the proportion of flavorings that is utilized relative to the other ingredients, it is desirable that flavorings equal to or greater than at least about 150% of the amount of flavorings used in the preparation of conventional porridge are incorporated to achieve a significantly "enhanced flavor intensity." In some embodiments, flavorings equal to 200% or more of the amount of flavorings used in the preparation of conventional porridge are incorporated to achieve an enhanced flavor intensity profile. Stated otherwise, flavorings used in the oatmeal product of the present teachings comprise at least about 20% by weight of the oatmeal product, and up to about 45% by weight overall.

Flavorings, including fruit ingredients, that can be added to the oatmeal product of the present teachings include, but are not limited to: brown or white sugar, cinnamon, salt, nutmeg, honey, jams, molasses, maple syrup, corn syrup, caramel, fructose, carob or other sweeteners, vanilla, butter, peanut butter, chocolate, milk, cream, water, applesauce, bananas, nuts, raisins, dates, blueberries, cherries, apricots, or other dried or fresh fruits, and other desirable flavorings.

Once the water and flavorings have reached an elevated temperature over boiling point (e.g. about 200° F.) and have stewed for up to about 30 minutes, one or more varieties of grains or seeds such as pre-processed or unprocessed wheat, flax, rye, millet, spelt, rice, triticale, buckwheat, bran, barley and corn, and at least about 10% to 20% oats by weight, are added to the liquid mixture and cooked for approximately 20 to 60 minutes. In several embodiments, cooking time is increased to a range of about 30 to 90 minutes to ensure that an oatmeal product having a much higher viscosity and consistency, generally in the range of about 2,500 cp to about 3000 cp, is obtained. Oats, including for example, rolled oats, whole oats, steel cut oats, bumped oats and groats can be used in desired percentages, but preferably comprises at least 14% by weight of the overall mixture. In various embodiments, the mixture comprises at least 15% to 60% by weight oats, in any form or combination. In some embodiments, the mixture comprises up to about 65% of other (non-oat) pre-processed or unprocessed grains or seeds.

The cooking times may vary, of course, based on the type of oatmeal selected and the grain or seed utilized. For instance, the constituents frequently exhibit different physical properties based on whether or not the protective hull is modified or removed from the exterior of the oats, grains and/or seeds due to milling. The starch in rolled oats, for example, converts to a digestible form in a relatively short period of time due to the pre-processing of such oats. Thus, a cook time in the 20 to 60 minute range is generally suitable for achieving both palatability and a viscosity of at least 2,500 cp. In contrast, the starch in steel cut oats and groats converts to a digestible and chewable oatmeal form over a longer period of time. Thus, when added to the mixture, these types of oats can be cooked for lengthier times, approaching the upper end of the 30 to 90 minute range, to achieve a desirable texture, a 2,500 cp viscosity and to account for the generally less rigorous pre-processing of such oatmeal.

It will be understood that the cook times disclosed herein have been selected to achieve an approximately 2,500 cp to about 3000 cp viscosity and to avoid undercooking a particular constituent of the oat mixture. Thus, after about 90 minutes of boiling, all constituents of the mixture are sufficiently cooked, and thus edible and appropriate for consumption by a consumer. Likewise, after about 90 minutes of boiling, the oatmeal mixture attains a desired viscosity of at least 2,500 cp. Since the present teachings contemplate the use of both unprocessed and processed oats, grains and seeds, it will be appreciated that cook times somewhat beyond the disclosed ranges may be appropriate depending on the amount of pre-processing to which each constituent has been subjected.

As mentioned, following selection of the constituent parts and percentages, a non-solidified oat-based mixture is formed. It is not necessary to stir the constituent parts to form a uniform blend, but periodic stirring may be desirable to achieve a desired consistency and some uniformity in the oatmeal product.

Once cooking is completed (up to about 90 minutes), the resultant oatmeal product achieves a concentrated, yet non-solidified texture. In particular, based on the various protocols, graduated cooking times and temperature profiles of the present teachings, the oatmeal product comprises a viscosity and consistency of at least about 2500 cp to about 3000 cp. (Measurement obtained by a Brookfield viscosity meter at RPM'S of 100, spindle-5 percentage 60% to 70% at a temperature of 165° F. to 175° F.) The water composition of the oatmeal product is generally about 63% to about 75% by weight and, in some embodiments, is about 65% to about 70% by weight, which effectively minimizes any spillage or dripping during use by a consumer.

Advantageously, the concentrated oatmeal product comprises an enhanced flavor intensity profile due to the inclusion of flavorings equal to or greater than at least about 20% by weight of the oatmeal product, and up to about 35% by weight overall. Such significantly higher flavor intensity compensates for the lack of flavor inherent in several of the grain and seed based products utilized herein.

The oatmeal product is transferred from the boiler (e.g., through piping) into a hand-held prepared food component, which can be grain-based, seed-based, baked, or a combination of the foregoing. Such prepared food components include, but are not limited to, edible food wraps, tortilla shells, bagels, breads, pancakes, waffles, cereal bars and dough pockets. A desired portion of the oatmeal product is placed into an opening or onto an exposed surface of the prepared food component so as to comprise from about 10% to about 90% by weight of the combined oatmeal and prepared food product. In some embodiments, the oatmeal product comprises a range of about 20% to about 80% by weight of the combined oatmeal and prepared food product. This allows the combination oatmeal and prepared food product to be consumed as a part of a portable breakfast or packed for consumption later in the day at work or school. If desired, the combined oatmeal and prepared food product can be microwaved or otherwise heated briefly prior to consumption, or the combination oatmeal food product can be served at room temperature or colder.

In some embodiments, the concentrated oatmeal product is transferred from the boiler (e.g., manually or by automated scooping) and is then packaged for distribution to consumers. The oatmeal product thus comprises a form that can be used by consumers as a filling (e.g., for edible wraps) or as a spread on bagels, toast or other bakery products. In this regard, packaging that is impermeable to moisture is appropriate. Likewise, packaging that allows for microwave heating is suited to the present teachings. Utilizing, for example, a "hot pack" packaging method, the oatmeal product is heated to above about 200° F. to 210° F. A desired portion of the oatmeal product is introduced (i.e., hot filled) into an air tight container, and a vacuum seal is created through the process of heating the oatmeal product to above 210° F. and thereafter cooling the oatmeal product and its container while under seal. This creates a vacuum in the sealed container. Plastic jars or containers (e.g., one ounce to 32 ounces) having induction or foil seal lids can be used for this purpose. Once the oatmeal product is transferred from the boiler and placed into the containers, and the containers are sealed, a sterile package results.

Any number of packaging methods known in the industry can be used to package the oatmeal product for mass distribution. The hot packing technique, however, is adapted for sealing and storing the oatmeal product and generally results in an oatmeal product that more easily retains both a uniform viscosity and an enhanced flavor intensity profile. This packaging technique is also suitable for large volume production as opposed to small batch or single serving preparation.

In some embodiments, an oatmeal product having a temperature of about 130° F. is incorporated into a prepared food item, placed directly into a removable film (e.g., plastic), wrap, pouch, container or other packaging, and then is refrigerated or frozen to preserve freshness. This reduces or eliminates the need for unnatural preservatives to achieve stability. In some embodiments, the oatmeal product, along with its prepared food item, is passed through a refrigerator or cooling chamber for approximately 20 to 30 minutes to achieve a chilled temperature of about 40° F. to 85° F. In this manner, the oatmeal food product can be thawed, reheated by means of a microwave, convection oven or other heating apparatus, and consumed "on the run."

In some embodiments, the oatmeal product is pasteurized at a minimum temperature of 180° F. to enhance freshness and shelf life. Alternatively, a small quantity of preservative such as, for example, sodium benzoate, may be added to the oatmeal product to preserve freshness or where aseptic food service conditions are not maintained.

To provide a shelf stable grocery item, the completed oatmeal product has a pH of preferably between about 3.9 and 4.2 in accordance with the present teachings. If necessary, the oatmeal product can be acidified during cooking using a suitable pH modifier or naturally acidic flavoring such as pectin. The resulting oatmeal product can then be placed into a sealed container, plastic film or other packaging at an elevated temperature.

The section headings used herein are for organizational purposes only and are not to be construed as limiting the subject matter described in any way.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

What is claimed is:

1. A process for preparing a non-solidified, high viscosity oat-based mixture, comprising:
   cooking a mixture of water and concentrated flavorings of about 20% to about 45% by weight to reach a minimum temperature of about 190° F. to 220° F. for about 1 to 3 minutes;
   stewing the mixture of water and concentrated flavorings for up to about 30 minutes, said concentrated flavorings providing an enhanced flavor intensity profile;
   adding oats of about 10% to about 60% by weight to the water and flavorings mixture, said oats comprising rolled oats, whole oats, steel cut oats, bumped oats, groats, or a combination of said oats;
   adding one or more seeds or grains to the oats, water and flavorings mixture, said seeds and grains comprising wheat, flax, rye, millet, spelt, rice, triticale, buckwheat, bran, barley, corn, or a combination thereof; and
   boiling the oats, water, flavorings, seed and grain mixture for about 20 to 90 minutes to render the resultant oat-based mixture edible and to obtain
   a water percentage by weight of about 63% to about 75%, and
   a viscosity and a consistency of about 2,500 cp to about 3,000 cp at a temperature of 165° F. to 175° F.

2. The process of claim 1, wherein during said cooking step flavorings are added, the flavorings comprising salt, sugar, cinnamon, nutmeg, honey, jam, molasses, maple syrup, corn syrup, caramel, fructose, carob, vanilla, butter, peanut butter, chocolate, milk, cream, apple sauce, banana, nuts, raisins, dates, blueberries, cherries, apricots, or a combination thereof.

3. The process of claim 1, additionally comprising adding a pH modifier that acidifies the oat-based mixture to a pH of between about 3.9 and 4.2.

4. The process of claim 1, additionally comprising
   boiling the oat-based mixture to heat the mixture to a temperature about 200° F.;
   transferring a desired portion of the heated oat-based mixture into a moisture impermeable container;
   placing an induction lid on the container so as to seal the heated oat-based mixture in said container;
   cooling the oat-based mixture and sealed container, creating a vacuum seal therein; and
   storing the cooled oat-based mixture in the sealed container for distribution to a consumer.

5. The process of claim 1, wherein the flavorings of said cooking step comprise salt, sugar, cinnamon, nutmeg, honey, jam, molasses, maple syrup, corn syrup, caramel, fructose, carob, vanilla, butter, peanut butter, chocolate, milk, cream, apple sauce, banana, nuts, raisins, dates, blueberries, cherries, apricots, or a combination thereof.

6. The process of claim 3, wherein said acidifying step additionally comprises adding a natural acidic flavoring to the oat-based mixture.

7. The process of claim 6, wherein said acidifying step additionally comprises adding pectin to the oat-based mixture.

8. The process of claim 1, comprising a water percentage by weight of about 63% to about 70%.

9. The process of claim 1, additionally comprising adding sodium benzoate to the oat-based mixture.

10. The process of claim 1, comprising a flavorings percentage by weight from about 20% to about 35%.

* * * * *